Figure 3:
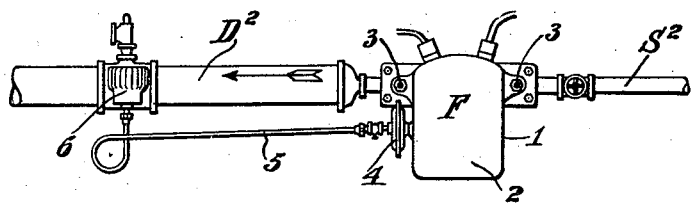

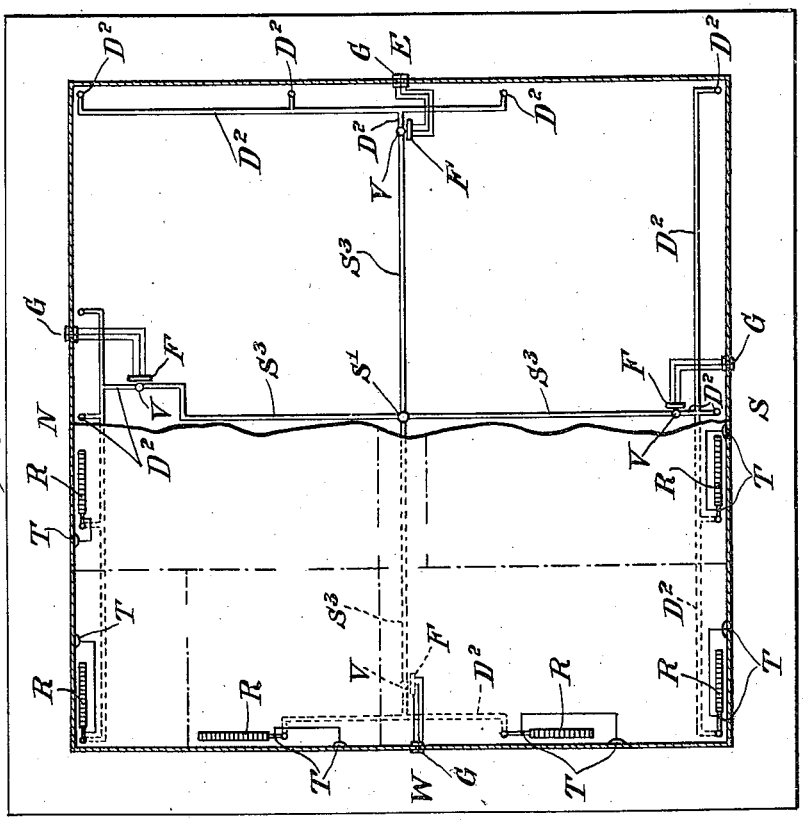
June 1, 1937.  W. TALLMADGE  2,082,470
CONTROL SYSTEM
Filed Nov. 29, 1929  8 Sheets-Sheet 1

June 1, 1937.  W. TALLMADGE  2,082,470
CONTROL SYSTEM
Filed Nov. 29, 1929  8 Sheets-Sheet 2

Webster Tallmadge
INVENTOR
BY W. B. Whitney
ATTORNEY

June 1, 1937. W. TALLMADGE 2,082,470
CONTROL SYSTEM
Filed Nov. 29, 1929 8 Sheets-Sheet 3

Webster Tallmadge
INVENTOR

BY W. B. Whitney
ATTORNEY

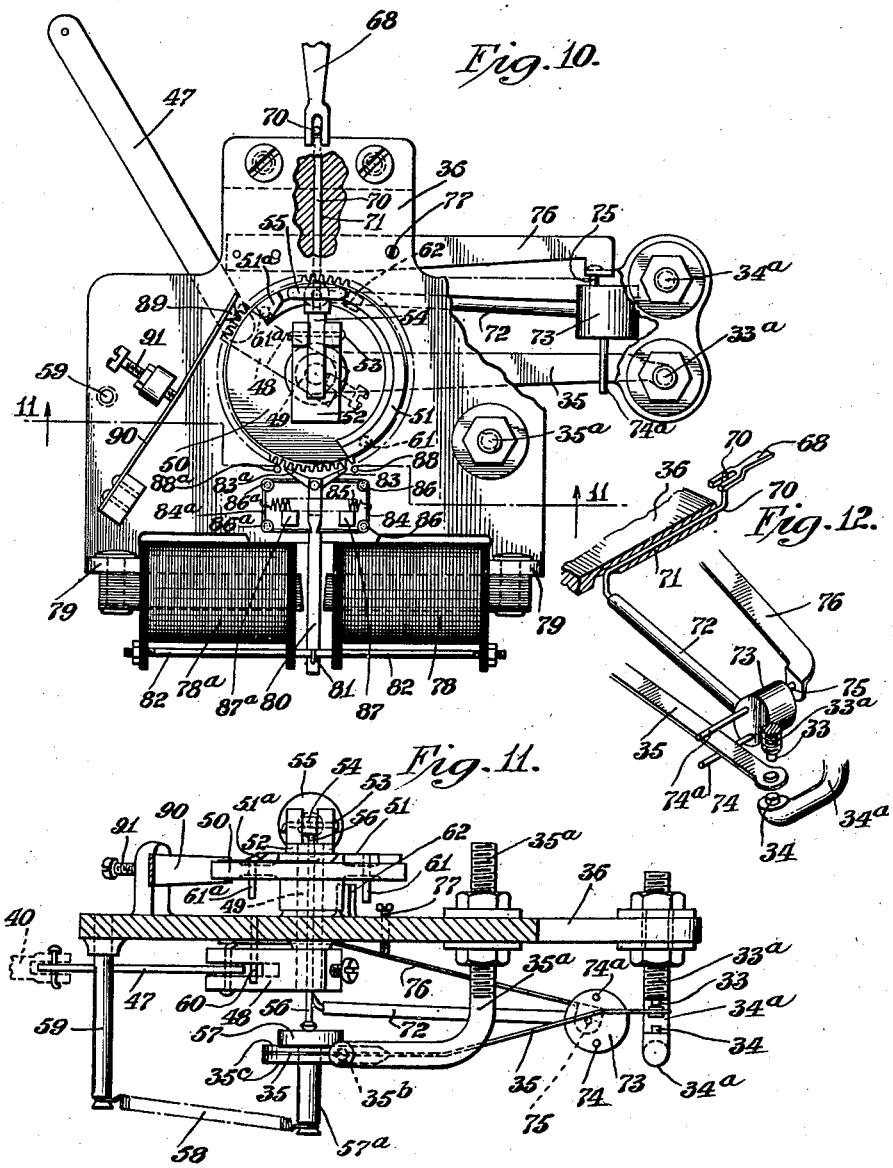

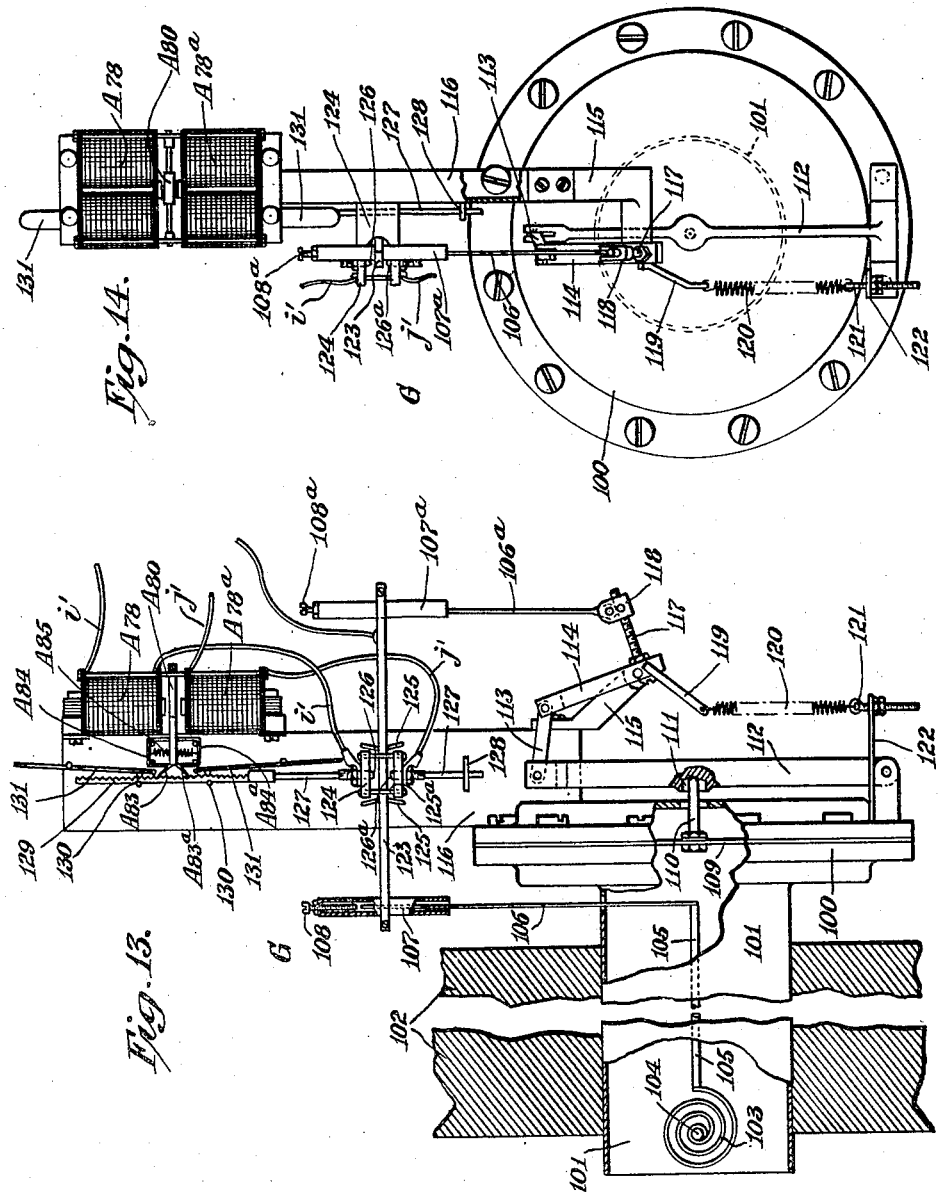

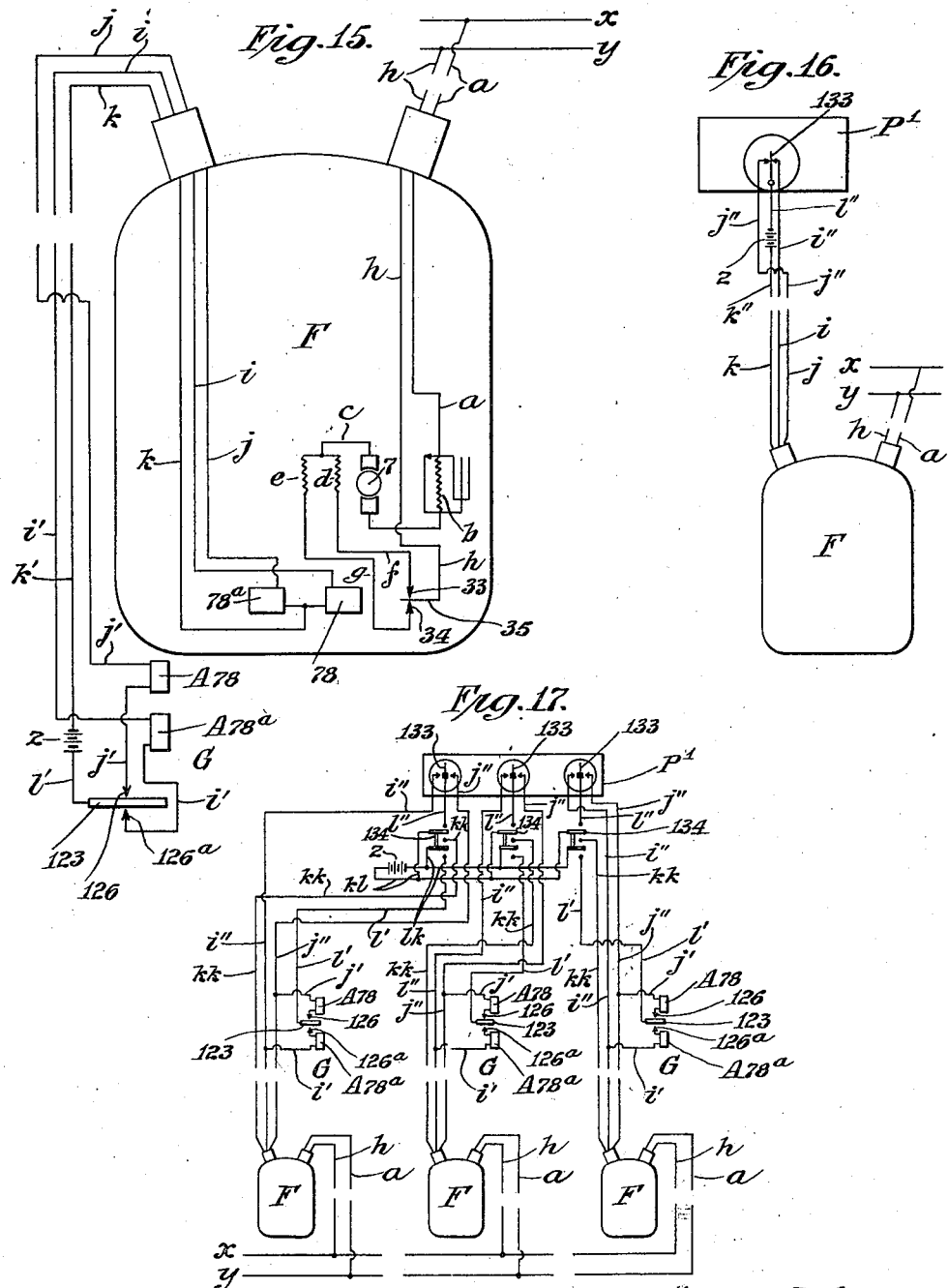

June 1, 1937.  W. TALLMADGE  2,082,470
CONTROL SYSTEM
Filed Nov. 29, 1929    8 Sheets-Sheet 7

Webster Tallmadge
INVENTOR
BY
ATTORNEY

June 1, 1937.  W. TALLMADGE  2,082,470
CONTROL SYSTEM
Filed Nov. 29, 1929  8 Sheets-Sheet 8

Webster Tallmadge
INVENTOR
BY  W. B. Whitney
ATTORNEY

Patented June 1, 1937

2,082,470

UNITED STATES PATENT OFFICE 2,082,470

CONTROL SYSTEM

Webster Tallmadge, Montclair, N. J., assignor to Webster Tallmadge & Company, Inc., New York, N. Y., a corporation of New York Application November 29, 1929, Serial No. 410,513

34 Claims. (Cl. 236—91)

This invention relates to a fluid circulating and distributing system, and, specifically, to a steam heating system, for a single building or for a group of buildings, although not limited thereto since, as will be apparent, it is applicable either in whole or in certain of its features to other systems in which a fluid is received under pressure from a source of supply and distributed through conduits to places of use.

In the heating or cooling of buildings, the fluid heating or cooling medium, for example, steam, generated in the basement of the building itself or of an adjacent building or supplied at high pressure from some central station, is usually admitted through a valve to a low pressure main and from such main is distributed through risers, in a large building commonly one or more on each of its sides, to radiators located on the different floors.

The amount of steam required to adequately heat a given space depends largely of course on the outside temperature, which varies not only according to the latitude and season but also from day to day and, daily, from night to day.

The required amount of steam further varies widely, on the different sides of a building, according to the everchanging velocity of the wind and whether or not the rooms are protected therefrom by other structures and do or do not receive heat from the sun, and it also varies considerably between the upper and lower floors, especially of high buildings. On the windward side of a building there is always a leakage of the cold air from without into the building through the cracks in its windows and doors, and even through the walls which are usually more or less porous; and this air is to some extent carried through cracks and opened doors across, and with it carries heat, from the windward to the leeward side of the building. Consequently, on windy days more steam is always required than on other days to comfortably heat the rooms on the windward side of a building, while less steam may be required to heat the building on its leeward side. And, except as affected by other conditions, more heat is required for the lower than for the upper stories of a building since the heated air, being lighter than cold air, creates a draft which draws it up from the bottom to the top of a building.

The steam required varies, still further, in different parts of the space to be heated according to the different uses to which the same are put. For example, in an industrial plant, the quarters provided for the executive and clerical forces have to be heated accordingly, a storage section may require little heat or only enough to keep the raw or finished materials therein stored from freezing or in the required condition, while in the manufacturing section it is not infrequent that, after an initial heating in the morning, the motors used for power, the heat-generating machines or processes, and the activities of the human operators, will furnish all the heat required.

Every steam heating plant has to be designed so as to adequately heat all parts of the space on the coldest days and under the most unfavorable conditions. Hence, it may be said to be the usual experience that, under moderate weather conditions where heat to only say one-half of the capacity of the plant is required, either the entire space will be overheated, or, under certain systems of pressure and orifice control as at present practiced, there will be an uneven distribution of the heat so that certain parts of the space may be heated comfortably, or overheated, while other parts will be left without sufficient or any heat. Moreover, it is the usual practice for the occupants of rooms which get overheated to lower the temperature therein by opening the windows rather than by regulating the supply of steam to the radiators and so to waste the heat and perhaps deprive other less favorably situated rooms of a part of their heat.

It is therefore seen that, in order to adequately, comfortably, and economically heat a given space, it is necessary not only to keep the total supply of steam constantly adjusted to the amount required for the entire space served but also to regulate from time to time its distribution to each different part of the space, according to many different and ever changing conditions; otherwise, certain parts of the space will be insufficiently heated while others will be overheated, causing discomfort to all the occupants and usually a very considerable waste of steam.

In Letters Patent No. 1,653,485, dated December 20, 1927, there was disclosed and claimed a system of control, comprising a pressure-controlled motor for actuating a valve to automatically control the flow of steam from a supply pipe to a distributing main and means controllable by an attendant from some convenient central point not only for adjusting the pressures to which the motor actuating the control valve would respond but also for regulating the amount of steam admitted from the distributing pipe to each of the risers through which the steam was carried from the distributing pipe to the radiators, which satisfactorily met the requirements for adequate and economical steam heating hereinabove noted.

The specific object of the present invention, which is in the nature of an extension of and improvement upon the system of said earlier Letters Patent, is to provide a further and better control both for the supply and the distribution of a fluid heating or cooling medium to the different parts of a building, or group of buildings, so that every part thereof may be supplied with so much and only so much of such fluid medium as is required under the conditions prevailing at the time to adequately and comfortably heat or cool the same, to thereby better provide for the comfort and health of the occupants and to effect still greater economies in the amount of the fluid medium used and of the fuel required for its production.

To this end the invention comprises, as one of its main features, a division of the space which is to be heated or cooled from a single source of supply of the fluid heating or cooling medium into such a number of zones, both horizontal and vertical, as demanded by the different requirements of different parts of the space, a supply of the fluid medium to the radiators or equivalent heat transfer devices in each zone at a pressure relatively more uniform as compared with the practice heretofore, and the equipment of the pipes supplying the fluid medium to the distributing pipes of each zone with a simplified and otherwise improved control device which is responsive to a pressure of the fluid medium within the distributing pipes adjustable according to outside conditions either automatically or manually by an attendant from some convenient central point and is operative thereunder to automatically regulate the amount of the fluid medium supplied to the zone upon a new principle, that is to say, according to a schedule based upon the basic curve, substantially a parabolic curve, for the flow of a fluid through an orifice under pressure.

The invention comprises, as a second feature, a second, or auxiliary, control device which is responsive to temperature conditions outside and/or the differential air pressures outside and within the building and is adapted, in connection with the main control device and operative jointly therewith, to provide full automatic control of the fluid heating or cooling medium as required in the particular zone.

A third feature consists in a new orifice system of control for the heat transfer devices. Heretofore, it has been the practice to pay little attention to the pressures of the fluid heating or cooling medium within the distributing pipes and to attempt a control of its distribution to the individual heat transfer devices or radiators connected to such pipes at different points along their length either by providing each radiator with a restricted inlet orifice proportioned directly both to the size of the radiator and to the point of its connection with and hence the friction of the pipe, or, on a plan known as compounding, by providing each radiator with a restricted orifice calculated as stated and also by inserting in each riser in the distributing system a similar orifice similarly calculated. The result, in either case, is that, if the system has been designed to provide a satisfactorily uniform distribution of the fluid heating or cooling medium on a full demand basis, whenever such demand is reduced materially those radiators located farthest out on the distributing pipes will, owing to the friction of the pipes, receive little or none of the fluid medium. This feature of my invention, by which there is obtained a practically uniform distribution of the fluid medium to all the radiators, whatever their location and under varying service conditions, consists in providing the radiators with inlet-orifices of an area proportioned to the size or heat transfer capacity thereof and uniform for all radiators of the same size wherever located which will afford a high resistance to the passage of the fluid medium as compared to the resistance offered thereto by the distributing pipes, in omitting from the distributing pipes the intermediate regulating orifices, and in maintaining within the distributing pipes a pressure of the fluid medium sufficiently high to supply to the radiators connected therewith through said inlet-orifices the maximum, or any desired percentage of the maximum, of the fluid medium required.

A fourth feature consists of a thermostatically controlled device for automatically throttling or varying the effective area of the fixed inlet-orifice of individual radiators, without changing or completely closing such orifice, to thereby regulate the amount of the fluid medium admitted thereto according to local temperature conditions in the room in which the radiator is located.

The invention also embraces the other novel features and combinations of features, both of structure and of method hereinafter described and more particularly pointed out in the appended claims.

One practical embodiment of the several features of the invention, in what is now believed to be the best form thereof, is shown, by way of illustration and not of limitation, in the accompanying drawings, in which—

Figure 4:
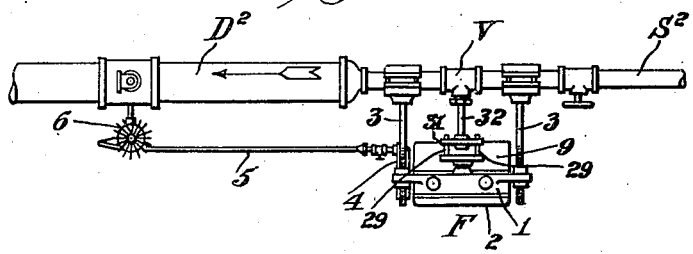
Figure 5:
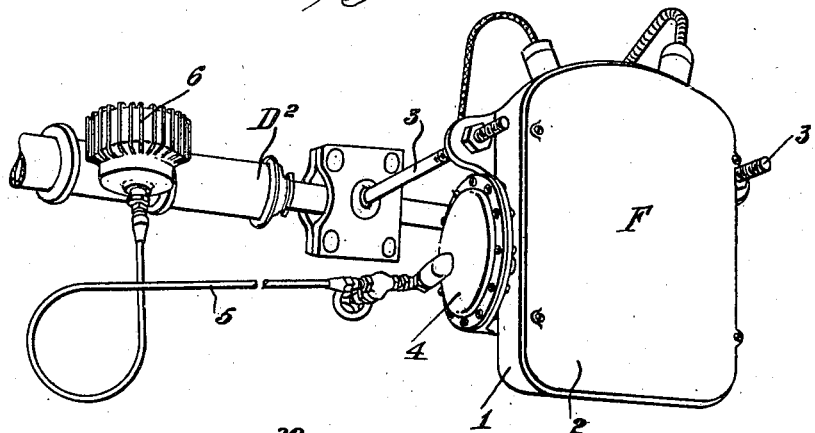
Figure 9:
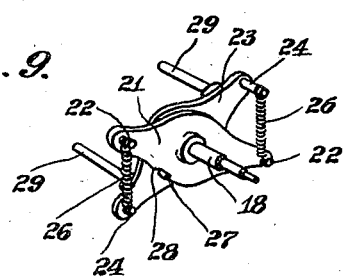
Figure 6:
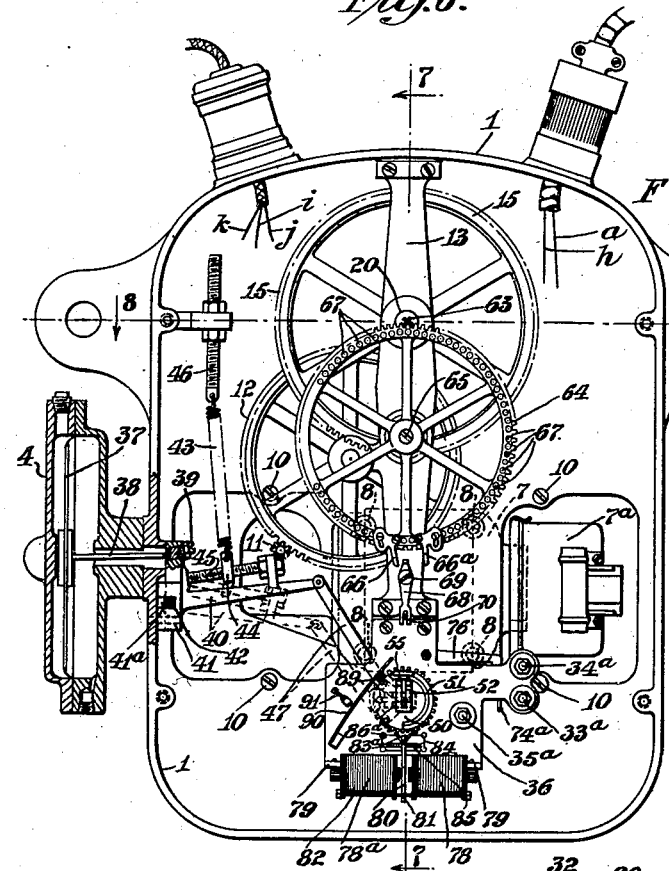
Figure 7:
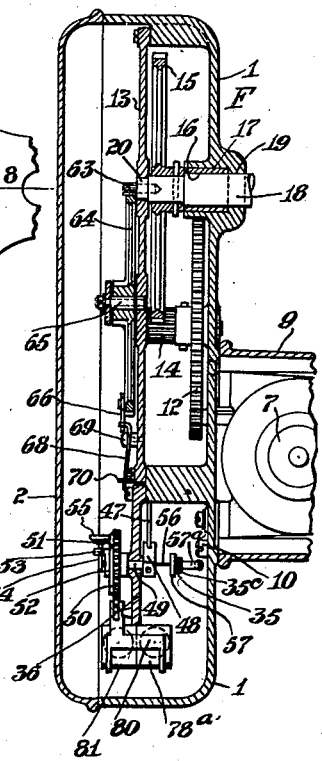
Figure 8:
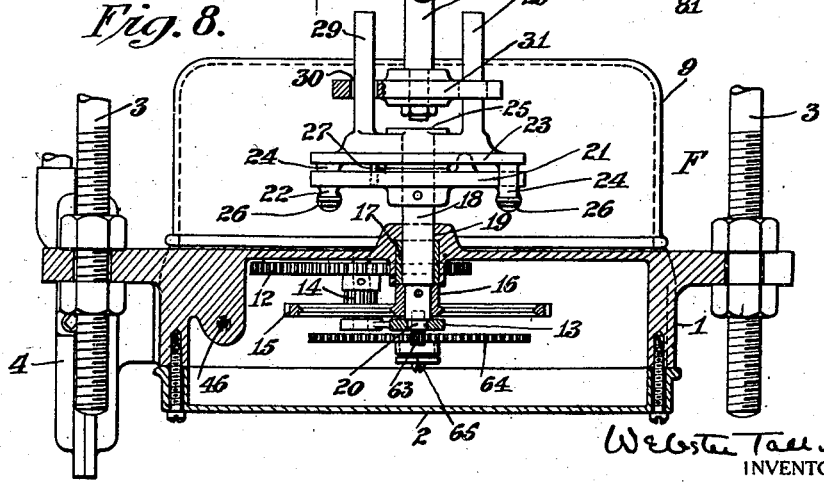
Figure 18:
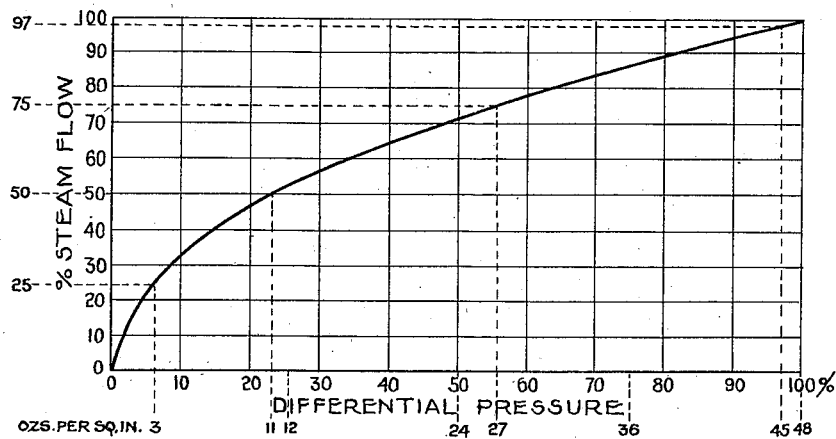
Figure 19:
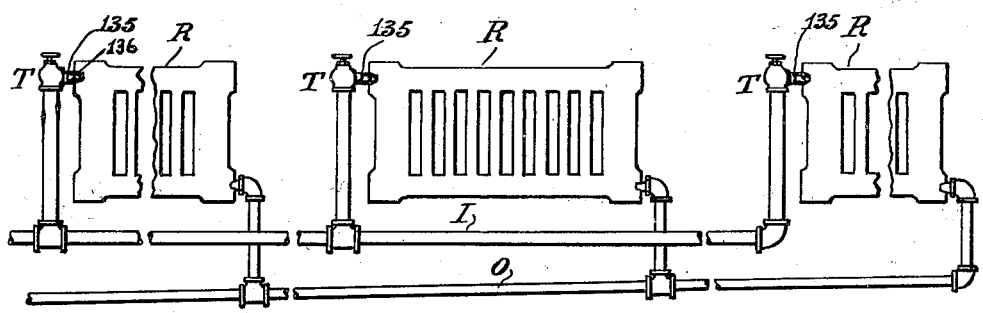
Figure 20:
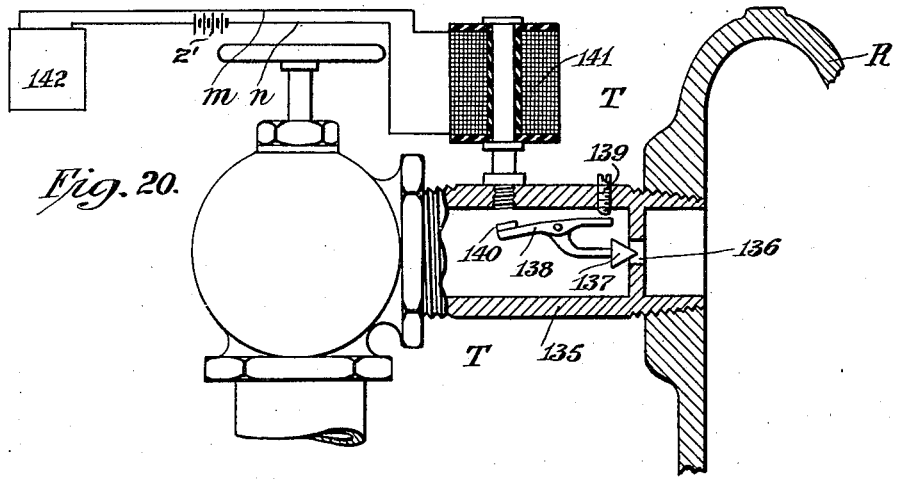
Figure 21:
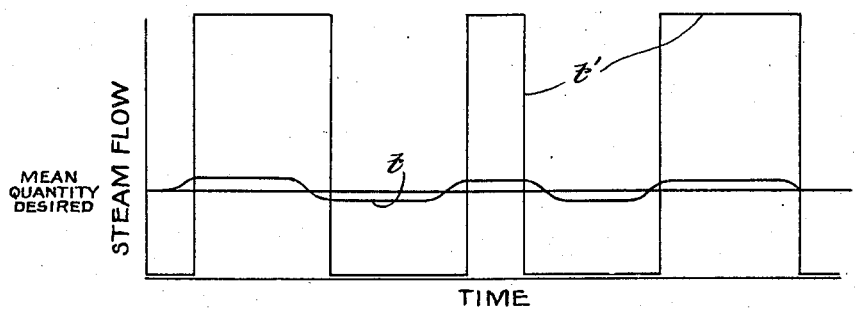

Figure 1 is a conventional view of a high building showing, in vertical section, the vertical zones into which the building may be divided and a convenient arrangement of the pipes for conducting steam or other fluid heating or cooling medium from a source of supply, here in the sub-basement of the building, to the distributing pipes serving the radiators or equivalent heat transfer devices of the different zones, and a suitable location of the several control devices in connection therewith; Fig. 2 is an enlarged sectional view, on the line 2—2 of Fig. 1, showing the horizontal zones into which each vertical zone of the building is or may be divided, and an arrangement of steam supply and distributing pipes, radiators and control devices therein; Figs. 3, 4 and 5 are views, in side elevation, plan, and enlarged perspective respectively, of a section of a branch valve-controlled supply pipe and the adjoining connected end of a zone distributing pipe equipped with my improved valve control device; Fig. 6 is an enlarged view of the valve control device, with the front cover of its casing removed, showing the mechanism thereof largely in front elevation and to a small extent in section; Figs. 7 and 8 are sections on the line 7—7 and 8—8 of Fig. 6 respectively but showing the cover of the casing in place; Fig. 9 is a detail of the spring clutch, in perspective; Fig. 10 is a view, corresponding to Fig. 6 but further enlarged and with certain parts in different positions, of the relay and associated mechanism therein shown; Fig. 11 is a section on the line 11—11 of Fig. 10; Fig. 12 is a detail, showing certain parts of the control mechanism in perspective; Fig. 13 is a view of the auxiliary control device responsive to differential air pressures and outside temperature conditions, showing the same in side elevation, with parts broken away, in connection with the broken section of an outer wall of the building; Fig. 14 is a view showing the said auxiliary device in inner front elevation; Fig. 15 is a diagrammatic view of the electric circuit connections of a main and auxiliary control device jointly operative for the complete automatic control of the regulating valve; Fig. 16 is a diagrammatic view of the electric circuits of a main control device, outside the casing of the device itself, providing an automatic operation of the same with manual adjustments to different pressures by an attendant from a convenient central point; Fig. 17 is a diagrammatic view of the electric circuit connections of a plurality of main and auxiliary control devices whereby each main device can be operated either in association with an auxiliary device to provide complete automatic valve control or can be disconnected from the auxiliary device to operate at pressures manually regulated by an attendant from some central point; Fig. 18 is a diagram showing the basic curve, substantially parabolic, for the flow of steam through an orifice at gauge pressures not exceeding ten pounds when discharging to atmosphere as shown, or, stated generically, when the terminal absolute pressure does not exceed fifty-eight percent of the initial absolute pressure, the upper of the horizontal rows of figures being percentage figures of maximum differential pressure and the lower row of figures illustrating a practical application of the curve in ounces per square inch, while both vertical rows of figures are figures representing the percentages of steam flow at various pressures; Fig. 19 is a view, in side elevation, of a series of radiators connected in multiple to a single distributing pipe, for illustration of my new combined pressure and high resistance orifice system of control; Fig. 20 is a view, partly in plan and partly in section, of the inlet-pipe connection to a radiator provided with a fixed inlet-orifice equipped with a thermostatically controlled device for throttling but not entirely closing the inlet-orifice; and Fig. 21 is a diagram showing the curves of steam flow to the radiator both under my thermostatically controlled orifice throttling device and under the usual thermostatic control.

Referring first to Figs. 1 and 2 of the drawings, the building is here shown as divided into three vertical zones A, B and C, each of which is in turn divided into four horizontal zones N, E, S and W; and the steam-heating system comprises a steam-generating plant P, main and branch steam supply pipes $S^0$, $S^1$, $S^2$, $S^3$ and $S^4$, distributing pipes $D^1$, $D^2$, $D^3$, radiators R, and a plurality of control valves V, main control devices F, auxiliary control devices G, and radiator orifice control devices T.

The steam-generating plant P is located in the sub-basement of the building, and here also is, or may be, placed a panel $P^1$ on which are mounted the switches for the manual adjustment, if desired, of the steam pressures to which the control devices F will respond, as hereinafter described. The supply pipe $S^0$ connects the steam plant with the lower end of a centrally located supply riser $S^1$ from which lead off, at the lower part of each of the vertical zones of the building, the branch supply pipes $S^2$, $S^3$ and $S^4$, one of each to each of the four horizontal zones, and each of these branch supply pipes is provided adjacent its outer end with a control valve V. To the outer end of each of the branch supply pipes is connected one set of the distributing pipes $D^1$, $D^2$, $D^3$, and a fourth (not shown) each including lower horizontal connecting and manifold pipes, risers, and, on each floor of the building, horizontal connecting and manifold pipes to the radiators R. A main control device F is operatively associated with each control valve V, and with each device F there is in turn associated an auxiliary control device G. The radiator orifice control devices T are associated each with an individual radiator, as desired.

Each main control device F, as shown in Figs. 3–12, consists of a casing 1, with removable front or top cover 2 which is adjustably secured upon rods 3 clamped to a branch supply pipe, $S^2$ for example, in position over valve V; and on one side of this casing is mounted the casing 4 of a diaphragm chamber connected on its outer side by pipe 5 through the chamber of a condenser 6 with the adjoining end of a distributing pipe, as $D^2$.

The motor 7, which operates the valve and which is preferably a standard series universal split-field back-geared motor, is mounted on the back of the rear casing wall in any suitable manner, as by screws 8 on the opposite sides of openings through the back casing wall, and is enclosed by a transversely elongated hood 9, of U-shape in cross-section, which is also secured to the back of the casing in any suitable manner, as by screws 10. This motor is operatively connected with the valve through a train of gears and a spring clutch and axially slidable clutch connection with the valve stem as follows: A pinion 11 fixed to the end of the back gear shaft of the motor, which shaft extends through an opening in the back casing wall, meshes with a gear 12 which is journaled in bearings provided at the back in the rear casing wall and at the front in a boss on a side arm of a narrow bearing-bar 13 fixed at its ends by screws to bosses projecting from the rear casing wall, and carries a pinion 14 fixed thereto and meshing in turn with a gear 15. The gear 15 has a rearwardly projecting hollow hub 16 which at its rear end is journaled in a step-bearing 17 in a boss on the rear casing wall and is pinned to a short clutch shaft 18 passing through a journal bearing 19 in the boss, then through the hub of the gear and at its reduced forward end 20 is journaled in a bearing in the bearing-bar 13. The shaft 18 has fixed thereto, at the back or bottom of the casing and adjacent its rear or lower end, a clutch-yoke 21 provided at its ends with posts 22 22, and a second clutch-yoke 23, also provided with posts 24 24 at the ends of its arms, is mounted to rock upon the shaft between a shoulder at the back of the clutch-yoke 21 and a shoulder provided by the headed rear end 25 of the shaft; and the posts on one yoke are respectively connected to the corresponding posts on the other yoke by springs 26 26 which yieldingly limit the relative angular movement of the two clutch-yokes in one direction while a stop pin 27 set into clutch-yoke 23 serves in connection with a shoulder 28 on the edge of clutch-yoke 21 to limit the relative movement of these parts in the opposite direction. The rear clutch-yoke 23 also carries two fixed rearwardly projecting pins 29 29 which slide loosely within openings 30 30 in a yoke 31 fixed to the end of the stem 32 of valve V, the casing of the control device being so positioned on the branch supply pipe that the clutch shaft 18 will be in axial alignment with the valve stem.

The operating electric circuit of motor 7 is controlled by a switch (see Figs. 10 and 11) with two oppositely disposed fixed contacts 33 and 34 and a movably mounted spring switch blade 35 carrying contacts between and operatively related to the two fixed contacts, the fixed contacts being respectively carried by binding posts 33ª and 34ª (the latter with offset end to bring the contacts into alignment) adjustably secured by nuts within insulating bushings in a supporting plate 36 fixed by screws to the same boss on the casing to which an end of the bearing-bar 13 is attached, and the spring switch blade being pivotally mounted at its shank, thickened by sweating to its opposite sides stiffening plates 35ᶜ 35ᶜ, upon the reduced end 35ᵇ of a binding post 35ª having two bends and also adjustably secured by nuts within an insulating bushing in the supporting plate; and this operating circuit (see Fig. 15) comprises wire $a$ which connects a line wire $x$, or other suitable source of direct or alternating current supply, preferably around or through a resistance $b$ under control of a standard or any suitable automatic governor 7ª associated with the motor, to one brush of the motor, wire $c$ which connects the other brush of the motor to the split-field windings $d$ and $e$ and through these windings by wires $f$ and $g$ respectively to the binding posts of the fixed contacts 33 and 34 of the control switch, and wire $h$ which connects the binding post of the switch contact blade 35 back to line wire $y$, or to the opposite side of the source of current supply. Hence, when the blade of the switch is moved into engagement with contact 33 the motor will be operated in one direction, to open the control valve, and when this switch blade is moved in the opposite direction to engage contact 34 the motor will be reversely operated, to close the control valve.

The operation of the motor, to actuate the control valve, is automatically controlled, through the switch described, by the steam pressure within the distributing pipe which is connected, as stated, with the outer side of the diaphragm chamber in casing 4 through the connecting pipe 5 and condenser chamber 6. For this purpose, the diaphragm 37, fixed between the two halves of the diaphragm casing, carries centrally mounted thereon a plunger 38 which projects inwardly through a somewhat enlarged opening provided therefor in the adjoining walls of the diaphragm casing and the main casing and its rounded cone end bears against the bottom of a cup-shaped depression in the end of an adjusting screw 39 set into the short arm of a bell-crank lever 40, which lever is fulcrumed within a longitudinal slot in a block 41, secured in any suitable manner to the side wall of the casing, by a pivot pin 42 with knife-edge ends bearing in the corner of a transverse slot 41ª in the block. The cup-bearing thus provided in the arm of the bell-crank lever is yieldingly held against the tip of the diaphragm plunger by a pressure spring 43 which at one end is fixed to a threaded nut 44 on an adjusting screw 45 set with lock-nuts into a lug on the long arm of the bell-crank lever and at its other end is fixed to a tension screw 46 adjustably set with lock-nuts into a lug on the casing. Within the forked end of the long arm of the bell-crank lever, substantially four times the length of its short arm, is pivoted a link 47 which at its other end is pivoted within the forked end of a pressure lever 48 fixed by a set screw to the back or lower end of a shaft 49, the connected ends of these two levers being so related that with a low pressure of steam on the condensed water bearing against the diaphragm the bell-crank lever will act on the link at an angle approximating a right angle while as the bell-crank lever is rocked further and further by the thrust of the diaphragm plunger under increasing steam pressures this lever will act at an angle more and more nearly approaching 180°, or a straight line, and so effect a gradually decreasing throw of the pressure lever. This action of the diaphragm on the pressure lever, through a lever system having the varying moment described, is based upon and conforms approximately to the basic steam flow curve (Fig. 18) which is substantially parabolic since variations in differential pressure near the minimum thereof produce rapid changes in the percentage of steam flow and the changes in steam flow gradually become less and less under variations in pressure as the upper limit of pressure is approached. The shaft 49, which is journaled in a bearing in the supporting plate 36, passes through the hub of a ratchet gear 50, having fixed on its outer surface a crown arcuate cam 51 with inclined end 51ª mounted to rotate thereon, and carries fixed to its forward or upper end a roller-block 52. This roller-block carries pivotally mounted, at 53, between two projecting lugs at its outer end, a roller-lever 54 which at its outer end carries a rotatably mounted roller 55, in position to bear upon the outer side of the ratchet gear and to ride upon the face of the crown cam 51, and at its inner end bears against a push-pin 56 mounted to reciprocate axially within an axial bearing through the shaft 49. The headed rear or lower end of the push-pin bears against the adjacent face of an insulating block 57 the outer face of which rests against the shank of the switch blade 35 and carries an integral pin 57ª connected at its outer end by a light spring 58 to the end of a pin 59 set into the supporting plate 36, the push-pin thus acting in opposition to the spring which tends normally to hold the switch-blade 35 against the contact 34. A stop pin 60 set into the supporting plate serves to limit the return swing of the pressure lever when the steam pressure on the diaphragm is released; and stop pins 61 and 61ª set into the ratchet gear 50 serve, in connection with a post 62 set into the supporting plate, to limit the rotation of this gear in both directions.

The tension of the pressure spring 43 is so adjusted, by means of tension screw 46, that the back pressure of plunger 38 on the diaphragm will neutralize the pressure thereon of the condensed steam in the condenser, connecting pipe and outer part of the diaphragm chamber when there is a normal pressure of steam in the distributing pipe and hold the diaphragm in a floating zero position (Fig. 6) close to but not actually in contact with the outer side wall of the diaphragm casing, thus rendering the diaphragm exceedingly sensitive to slight variations in low steam pressures. This spring is further adjusted to the steam pressures at which a particular plant is to be operated, as determined by the size and resistance of the inlet orifices to the radiators as hereinafter explained, by the nut 44 which is set further out on its adjusting screw for higher pressures and further in thereon for lighter pressures. And, finally, the opposing forces exerted by the push-pin 56 and spring 58 upon the shank of the switch blade 35 are so correlated that when the roller 55 bears on the inclined end face 51ª of the cam on ratchet gear 50 midway the length of such inclined face, the thrust of the push-pin on the block 57 will hold the contacts of the switch-blade in central open position (see Fig. 12) and the motor will be at rest. In case, however, there is a decrease of steam pressure in the distributing pipe (or if the ratchet gear 50 and the cam should be shifted counter-clockwise as viewed in Figs. 6 and 10) the roller will be caused to ride up the inclined end and then along the high flat face of the cam, thereby thrusting the push-pin further down or back so as to swing the switch-blade against the contact 33 (see Fig. 11) and thereby start the motor in the direction to open further the control valve and admit more steam from the supply to the distributing pipe. Or, on the other hand, if the roller is swung down from the inclined face of the cam and onto the side of the ratchet-gear by an increase of steam pressure in the distributing pipe (or by a clockwise shift in the angular position of this gear), the thrust of the push-pin will be removed to thereby allow the spring 58 to swing the switch-blade against contact 34 and so operate the motor as to move the control valve towards closed position.

The control switch is further provided with safety mechanism, to automatically stop the motor whenever the control valve has been moved either to closed or to fully open position, as follows: A pinion 63 is fixed, as by a screw, to the reduced end 2C of the clutch shaft 18, to rotate therewith and hence through the spring clutch with the valve stem. This pinion meshes with a gear 64 which is mounted on the outer or upper face of the bearing-bar 13 upon a screw stud 65 set into the bar, and it carries two tappets 66 and 66ª adjustably secured thereto by screws set into certain of a plurality of holes 67 drilled around a considerable portion of the gear. These tappets project out around the periphery of the gear on the opposite sides of the outturned end of a lever 68, pivotally mounted upon a screw-stud 69 set into the bearing-bar 13. The outer forked end of this lever (see Figs. 10-12) straddles the bent crank-end of a rock-shaft 70 which extends through and is journaled in a bore 71 drilled therefor in the supporting plate 36 and carries fixed to its other crank-end a light tubular extension 72. To the outer end of the extension 72 there is fixed a head 73, of insulating material, which has two pins 74 and 74ª set into what may be called its front face and extending out therefrom on the opposite sides of the spring switch-blade 35 and which at its back is fixed by a pin 75 to an ear on the outer end of a spring arm 76 fixed by screws to the back or under side of the supporting plate 36 and adjusted by a set screw 77, mounted in the supporting plate, to position to normally hold the head 73 centered with respect to the switch-blade so that neither of the pins 74 will engage the switch-blade as it is rocked back and forth between the contacts 33 and 34. The parts are so related and the tappets so positioned upon the gear 64 that, assuming the motor circuit to be closed through switch contact 34 and the motor to be operating to close the control valve, when the valve reaches its closed position the gear 64 will have been rotated sufficiently, in a counter-clockwise direction as viewed in Figs. 6 and 9, to have moved the tappet 66 against the outturned end of lever 68 and to have swung the lever and thereby rocked the shaft 71 and raised the head 73 so that the pin 74 has engaged the switch-blade 35 and sprung it away from contact 34, to open the motor circuit and stop the motor; or, in case the motor circuit is closed through switch contact 33 and the motor is operating to open the control valve, the gear 64, which is now being rotated in a clockwise direction, will when the valve is fully open have reached a position where the tappet 66ª has engaged and shifted the lever 68 and rocked the shaft 70 to press the pin 74ª against the switch blade and spring it away from contact 33, to likewise open the motor circuit and stop the motor.

The ratchet gear 50 is rotated to shift and adjust the angular position of the cam thereon, either by an attendant at some remote point or automatically by the outside wind and heat conditions, by means of a special double relay. This relay as here shown consists of two oppositely disposed electromagnets 78 and 78ª which are secured in any suitable manner to the outer end of the supporting plate 36, and by rivets to the ears 79. The coils of the magnets are at one end respectively connected to control circuit wires $i$ and $j$ and at the other end to a common wire $k$, which wires are carried out from the casing through an insulating plug set in a side thereof (see Fig. 15). A common armature 80, extending between and in operative relation with the adjacent pole pieces of the two magnets, is pivotally mounted upon a pin 81 fixed at its ends in bars 82 (one only shown) set into the magnet frames and carries pivotally mounted within its forked free end, adjacent the ratchet gear 50, an elbow member the tapered arms 83, 83ª of which serve as oppositely acting ratchet pawls. This armature is normally and yieldingly held in position intermediate the pole pieces of the two magnets, with both pawls out of engagement with the teeth of the ratchet wheel, by means of two light stirrup pieces 84, 84ª oppositely disposed and connected together by a light spring 85 which tends to draw the stirrups toward each other and each against stop pins 86, 86, 86ª, 86ª, set into the supporting plate within the bends of the stirrups and each bearing at one end in a notch in the side of the armature and at the other end against the inclined outer face of a pawl. The action of these stirrups is such that when one of the magnets, the magnet 78 for example, is energized and draws the armature over against its pole-pieces, the stirrup 84 will be pushed out from the stop pins 86 and the pawl 83 will be rocked upon its pivot by the pressure of the leg of the stirrup on its back into engagement with a tooth of the ratchet gear and will rotate the gear one tooth in a counter-clockwise direction as viewed in Figs. 6 and 10; and when the magnet is deenergized and releases the armature the spring will again act upon the stirrup to draw it back against the stop pins and so restore the armature to its normal central position and withdraw the pawl from the teeth of the ratchet gear. Stop lugs 87, 87ª on the face of the supporting plate aid the action of the stirrups, and two pins 88, 88ª set into the supporting plate each serve both to direct the end of a pawl against a tooth of the ratchet gear and to lock it against the adjoining tooth to prevent the rotation of the gear more than the single tooth. The ratchet gear is provided with a V-shaped click brake 89, carried by a spring 90 fixed to a lug on the supporting plate and tensioned by a set screw 91 set into a second lug, which serves to hold the gear while either pawl is being withdrawn.

The auxiliary control device G shown in Figs. 13 and 14, by which the angular position of the ratchet gear and cam of the main control device is automatically regulated according to outside temperature and to differential air pressures due to wind outside and/or the buoyancy of heated air within, will now be described.

A diaphragm casing 100 has on its outer half an integral cylindrical sleeve 101 which, serving as a wind tunnel, is set through an outer wall 102 of the building and at its inner end, within the building, is open to the outer half of the diaphragm chamber. Within the outer end of this sleeve, which serves as a support for the entire control device, there is mounted a standard or any suitable thermostat 103, as by fixing pin 104 to which the inner end of its coil is attached to the wall of the sleeve. The thermostat actuates as usual an arm 105 to the end of which is fixed a stiff upright wire 106, which wire extends loosely within a tube 107 of insulating material to abut at its end against the end of an adjusting screw 108 set into the threaded upper end of the tube. The diaphragm 109 mounted between the two halves of the casing carries a plunger 110 which extends through an opening of substantial size in the inner casing wall and at its rounded outer end bears against the cupped bottom of a socket 111 in the adjacent side of a lever 112 pivotally mounted at its lower end between two lugs on the diaphragm casing. The free upper end of this lever is pivotally connected by a link 113 to an arm 114 of a spider lever which is pivoted by a screw stud upon the end of a bracket piece 115 secured to the side of an upright plate 116 in turn secured by screws to the diaphragm casing. A second arm 117 of the lever, formed by a screw set at right angles into the first arm below its pivot, carries a nut 118 with a slotted ear within which is pivotally attached the end of a stiff upright wire 106ᵃ which, like the wire 106, extends loosely within a tube 107ᵃ similar to the tube 107 and likewise having set into its upper end an adjusting screw 108ᵃ against which the end of the wire bears. To the end of a third and somewhat shorter arm 119, which extends outwardly and downwardly at a more obtuse angle to arm 114 than to arm 117, is attached one end of a spring 120 attached at its other end to an eye-bolt 121 adjustably set into a post 122 on the diaphragm casing. The nut 118 is adjusted to effect the flow of steam required in the particular installation by the air leakage due to differential horizontal and/or upward air pressures, outside and within the building producing pressure or suction on either side or on both sides of the diaphragm, and the levers are as shown so proportioned and related that with low differential pressures variations therein will produce a relatively large shift of the wire and switch blade and progressively smaller shifts under progressively higher differential pressures, the action of the diaphragm upon the switch blade being here substantially the same as the action of the diaphragm with respect to the angular position of the roller block in the main control device. To the two tubes 107 and 107ᵃ there are clamped midway the length of each the opposite slotted ends of what may be designated as a floating switch blade 123 which, thus supported through the tubes by the wires 106 and 106ᵃ, passes midway its length through a relatively wide transverse slot extending across a movably mounted block 124 of insulating material and is loosely held positioned within the slot, to move vertically and rock slightly therein, by two pins 125, 125 with outwardly curved ends bearing lightly against the opposite sides of the block at the ends of the slot and a third pin 125ᵃ set into the block across the face of the slot. Two switch contacts 126 and 126ᵃ, which are held spaced apart one above and the other below the switch blade in cooperative relationship therewith, are adjustably set through the walls of the block forming the top and bottom of the slot and provide binding posts at the ends of the block for the attachment of the circuit wires. The block 124 is carried by a bar 127, which bar, set longitudinally through the block near the back thereof, is at its lower end mounted to reciprocate vertically in a slide bearing in a lug 128 on the face of the plate 116 and at its upper end is fixed to the end of a rack bar 129 bearing at its back against two pins 130, 130 set into the plate and lightly held in contact therewith by two spring clicks 131, 131 mounted on the plate.

The rack bar, and with it the block carrying the switch contacts, is reciprocated vertically, tooth by tooth up or down, by means of a double relay which is in all respects similar to the relay hereinabove described as used for the actuation of the ratchet gear of the main control device F, comprising the same oppositely positioned electromagnets A78 and A78ᵃ, suitably attached to the inner side of the plate 116, common armature A80 carrying pivotally mounted pawls A83 and A83ᵃ, stirrup pieces A84 and A84ᵃ and connecting spring A85, stop pins etc., all related and operating as described.

The circuit wires (see Fig. 15) i j and k, of the double relay in the main control device F are here extended and connected, wire i by wire i' to and through the coils of the magnet A78ᵃ and thence to switch contact 126ᵃ, the wire j by wire j' to and through the coils of the magnet A78 and thence to switch contact 126, and the wire k by wire k' to one side of a battery z, or other source of current supply, and from the opposite side thereof by wire l' to the floating switch blade 123.

It will be seen that the position of the floating switch blade 123 with respect to the switch contacts 126 126ᵃ is controlled jointly by the action of the thermostat under varying outside temperatures and by the diaphragm under varying differential air pressures outside and within upon that side of the building on which the auxiliary control device is located.

The action of the thermostat on a rise in the outside temperature is to tighten its coil and swing its arm 105 upwardly, thrusting the wire 106 and with it the tube 107 upwards, thus raising that end of the switch blade 123 upwards towards switch contact 126; and, conversely, if the temperature outside drops, the arm of the thermostat will be swung downwardly, lowering the wire 106 and allowing the tube 107 and that end of the switch blade to fall by gravity towards switch contact 126ᵃ. The diaphragm acts, through its connecting levers upon the other end of the switch blade, to draw the wire 106ᵃ downwards and allow the tube 107ᵃ and the corresponding end of switch blade 123 to fall towards the switch contact 126ᵃ, under increasing differential air pressures due for example to increasing wind pressure from outside, and, as the wind pressure decreases, the wire 106ᵃ and with it the tube 107ª is thrust upwardly and this end of the switch blade is raised away from switch contact 126ª and towards contact 126.

Thus, if either a rise in outside temperature or a decrease in the differential air pressure on this side of the building effects a rising of the switch blade against contact 126, the circuit from the battery z will be established through the coils of magnet A78 of the relay of the auxiliary control G and through the coils of magnet 78ª of the main control F and these two magnets will act simultaneously, the latter to shift the ratchet gear and its cam in the main control F one tooth in a clockwise direction, to start the motor in the direction to close the control valve and cut down the steam admitted to the distributing pipe, and the former to raise by one tooth the rack bar and with it both contacts 126 and 126ª of the auxiliary control G. In case the rise in temperature or decrease in the differential air pressure is sufficiently great, the switch blade will continue to be moved upwardly and will again close against contact 126, with the same result as before. The described action will be reversed, and, the magnet coils A78ª and 78 of the auxiliary and main controls respectively being energized, the motor will be started in the direction to open the control valve and admit more steam to the distributing pipe in case of a sufficient drop in the outside temperature or increase in the differential air pressure, and the contacts 126 and 126ª of the auxiliary control will be hitched tooth by tooth downwards to interrupt the circuit through the magnets. It may happen that a rise in temperature will counterbalance and neutralize an increase in the differential air pressure, or vice versa, in which case there will be no effective shift of the center of the switch blade of the auxiliary control and the motor of the main control will remain at rest; but the above-described action of the auxiliary control will be intensified whenever either a rise or drop in temperature coincides with a decrease or increase in the differential air pressure.

Should it be desired to place the adjustment of the ratchet gear and its cam, and thence the pressure of steam to which the main control device F will respond, under the control of an attendant, the actuating circuit wires of its relay magnets 78 and 78ª are extended to a suitable switch—for example, a single-pole double-throw switch 133 (Fig. 16) on the panel P¹ hereinabove described as located adjoining the steam plant in the sub-basement of the building, the wires i and j being respectively connected by wires i'' and j'' to the two fixed contacts of the switch and the wire k connected by wire k'' to one side of a battery z, or other source of current supply, and from the other side of the battery by wire l'' to the movable blade of the switch. Thus, on closure of the switch against one or the other fixed contact the ratchet gear will be shifted one tooth in one or the other direction, and by a number of such closures the gear can be shifted as many teeth as required. If desired, the switch can be used to connect a circuit interrupter, as shown in my earlier Patent No. 1,653,485 to the actuating circuits of the relay magnets. A special switch may also be provided which, by a single throw of its movable member to one side or the other to an extent indicated on a calibrated dial, will energize one or the other of the relays the number of times required to effect the desired change in the angular position of the ratchet gear.

An arrangement of circuits whereby the adjustment of the ratchet gear and cam of each of a plurality of main control devices F may be effected as desired either automatically, by the action of its associated auxiliary control G, or manually, by an attendant at some central point, is shown in Fig. 17.

Here, the wires i and j of each main control are respectively extended and permanently connected by wires i' and j' to and through the coils of the relay magnets A78ª and A78 to the contacts 126ª and 126 of the associated auxiliary control and by wires i'' and j'' to the fixed contacts of a single-pole double-throw switch 133, all as hereinabove described, and the common wire k is extended and connected by wire kk to the central of the three fixed contacts of a double-pole double-throw switch 134, a second contact of this switch is connected by wire l' to the switch blade 123 of the auxiliary control, its third contact is connected by wire l'' to the movable blade of switch 133, and the two movable blades of switch 134 are respectively connected by wires kl and lk to the opposite sides of a battery z, or other source of current supply. Accordingly, when the blades of a switch 134 are thrown in one direction, to close contacts with one set of wires kk and l', the wire k of the corresponding main control F will be connected by the wire kk, switch 134 and wire kl to one side of the battery and from the other side of the battery by wire lk, switch 134 and wire l' to the switch blade 123 of its auxiliary control G, placing the auxiliary in automatic control of the adjustment of the ratchet gear and cam in the main control F; and by throwing the blades of a switch 134 in the opposite direction the wire k of the main control F will be connected by the wire kk, switch 134 and wire lk to one side of the battery and from the other side of the battery by wire kl, switch 134, and wire l'' to the movable blade of the corresponding switch 133, whereby an adjustment of the main control F to pressure can be effected by the manipulation of switch 133 by an attendant.

My new system of inlet-orifice control, by which there is obtained as stated a practically uniform distribution of steam to all the radiators in a given space under varying service conditions, will be understood by reference to Figs. 18 and 19 of the drawings.

All the radiators in each zone into which the space is divided are supplied with steam from a distributing pipe, to which steam is supplied preferably under the control of the control device hereinabove described; and, as usual, series of these radiators R (Fig. 19) are connected in multiple to a branch I of the main distributing pipe, with a common return pipe O. The steam to the individual radiators in each series will meet with greater and greater pipe resistance the farther out it is located on the branch distributing pipe. The basic steam flow curve (Fig. 18), however, closely resembles a parabola; that is to say, a maximum of differential pressure will produce a maximum flow of steam through an orifice or passage of given area, while small percentages of such maximum differential pressure will produce relatively large percentages of the maximum flow of steam, the curve therefor having a relatively small radius, and gradually increasing percentages of differential pressure above a fairly low percentage thereof will produce gradually decreasing percentages of steam flow, the upper part of the curve gradually and progressively approaching a straight line. Accordingly, based upon this law, the pipes used in a given zone for the distributing pipe system are of a size to carry the steam to the particular zone served without undue pipe friction on a full steam demand basis, the inlet-orifice in the inlet-pipes 135 to all the radiators in the zone is directly proportioned in area and structure to the size (i. e., the square feet of radiating surface,) of each and is such as to afford a high resistance relative to the resistance of the distributing pipe and its branches, and provision is made for giving to the steam within the distributing pipes the maximum differential pressure required to effect the required maximum flow of steam to each radiator. For example, the area of the inlet-orifice for standard radiators of sixty-five square feet of radiating surface exhausting to atmospheric pressure varies from approximately 0.0146 to 0.06 of a square inch in connection respectively with maximum differential pressures varying inversely from ten to one-half pounds per square inch; and, as a specific instance, for a maximum differential pressure of forty-eight ounces per square inch the inlet-orifice of all standard size radiators is 0.025 of a square inch, and of a diameter to give an area directly proportional thereto for radiators proportionately greater or smaller in size.

Thus, on a full demand basis, a drop of say six per cent. from the maximum differential pressure (or from forty-eight to forty-five ounces per square inch in the specific instance given), at the radiator farthest out on a branch of the distributing pipe, due to the greater pipe friction, will produce a decrease in the flow of steam to the radiator of less than three per cent., which is practically negligible; and under milder weather conditions requiring only a part of the maximum steam flow the effect of pipe friction on the distribution of the steam becomes less of a factor. Furthermore, where the admission of steam to the distributing pipe is controlled by the improved control device hereinabove described, the action of the diaphragm upon the angular position of the roller-block and lever through the connecting linkage provided conforms as explained substantially to the basic steam flow curve; and, therefore, when conditions call for only say fifty per cent. of the maximum of steam flow to the radiators and the angular position of the ratchet gear and cam of the control device has been adjusted for such flow the control device will, through the action of the diaphragm, respond to pressures within the distributing pipe varying slightly, above or below, from twenty-five per cent. of the maximum, or approximately twelve ounces per square inch in the specific instance given, to automatically maintain the required flow of steam. Hence, the turning off or on of one or more radiators in a zone will have little if any effect since the automatic control on any change in pressure in the distributing system will promptly respond to maintain the flow desired to the radiators in service.

Referring now to Fig. 20 of the drawings, the thermostatic control T, for automatically throttling without closing the inlet-orifice of individual radiators according to local heat conditions, consists of a throttling head 137, located within the steam inlet-pipe 135 of the radiator R adjacent the inlet-orifice 136, which is carried by an arm of a lever 138 pivotally mounted within the walls of the inlet-pipe. An adjusting screw 139, set through the wall of the inlet-pipe and against which one end of the lever 138 normally bears, serves to adjustably limit the movement of the throttling head towards the inlet-orifice. The other end of this lever carries the armature 140 of an electromagnet 141 the pole-piece of which is set through the wall of the inlet-pipe in cooperative relationship with the armature. A thermostat 142, suitably located, controls the energizing circuit of the magnet, which includes a battery z' and wires m and n, being operative on a drop of temperature below a fixed point to close the magnet circuit, to withdraw the throttling head and admit an increased flow of steam to the radiator, and on a rise of the temperature to a higher given point to open the magnet circuit, to release the throttling head and allow it to swing towards the inlet-orifice to cut down the flow of steam to the radiator. Thus, with suitable adjustments of the screw and of the minimum and maximum temperatures to which the thermostat will respond, the device will maintain a flow of steam to the radiator close to the mean quantity desired and approximately as represented by the line $t$ in Fig. 21; whereas, under thermostatic control systems as heretofore employed, the flow of steam to the radiator is alternately turned fully on and fully off, giving a flow of steam thereto resembling the line $t'$ in Fig. 21.

While I have shown and described the control devices which constitute features of a complete new system of control as actuated and controlled electrically, it is to be understood that for such electrical means equivalent pneumatic, hydraulic or other means may be substituted; and, further, that certain of the features included therein may be used without the others and that the several features may be variously modified in their many details, within the scope of the appended claims, without departing from the spirit or sacrificing the substantial advantages of the invention.

The term "fluid", as used in the appended claims, includes broadly all liquids and gases which like oil, water and gas can be distributed through conduits to places of use; the term "fluid medium" is used to include all those liquids and gases, and only those liquids and gases, which like water, brine, steam and air, or their equivalents, can liberate, absorb and/or generate heat or cold and can be distributed through a distributing pipe system to heat transfer devices, to heat, cool and/or condition the surrounding atmosphere; and the term "heat transfer devices" as used, includes all heat-supplying or absorbing devices.

What I claim as new, and desire to secure by Letters Patent, is—

1. In a fluid distributing system, the combination of a source of fluid supply, a conduit system having at different points thereon a plurality of discharge orifices of areas and structure affording a high resistance relative to the resistance of the conduit system to the passage of the fluid therethrough, and means for controlling the supply of fluid from the supply source to the conduit system comprising a diaphragm responsive to the pressure of the fluid within the conduit system and an operative connection with members adapted to compensate for the varying relation between the pressure differential at and the fluid flow through said discharge orifices through which connection said diaphragm acts and is operative on variations in relatively low pressures in the conduit system to effect relatively large changes in the amount of the fluid admitted thereto and on higher and gradually increasing pressures therein to effect gradually decreasing changes in the amount of the fluid admitted.

2. In a fluid distributing system, the combination of a source of fluid supply, a conduit system having at different points thereon a plurality of valve-controlled discharge orifices of areas affording a high resistance relative to the resistance of the conduit system to the passage of the fluid therethrough, and means for controlling the admission of fluid from the supply source to the conduit system including a motor-actuated valve, a member responsive to pressure variations of the fluid within the conduit system, and a lever system having a substantially parabolic varying moment through which said pressure responsive member controls the valve motor and is operative on variations in relatively low pressures to effect relatively wide movements of the control valve and on lesser and gradually decreasing movements thereof to effect gradually increasing pressures to thereby maintain substantially constant an adjustable predetermined pressure of the fluid in the conduit system and at the several discharge orifices irrespective of variations in the number and location of those which may be open or closed.

3. In a system of the character described, the combination of a source of supply of a fluid medium, a distributing pipe system, a plurality of heat transfer devices connected with the distributing pipe system, and means for controlling the supply of the fluid medium from the supply source to the distributing pipe system comprising a member responsive to the pressure of the fluid medium within the distributing pipe system and a varying moment lever system through which said fluid pressure responsive member acts and is operative to control the amount of the fluid medium admitted to the distributing pipe system substantially in accordance with the approximate parabolic curve for the flow of a fluid through an orifice under pressure.

4. In a system of the character described, the combination of a source of supply of a fluid medium, a distributing pipe system, a plurality of heat transfer devices connected with the distributing pipe system, and means adjustably responsive to different pressures of the fluid medium within the distributing pipe system for controlling the admission thereto of the fluid medium from the supply source, said control means comprising a motor-actuated valve, a pressure responsive diaphragm, and a connecting system having members adapted to compensate for the varying relation between the pressure differential at and the flow of the fluid medium through the inlet orifices of the heat transfer devices through which connection said diaphragm acts to control the valve motor and through which it is operative on variations in relatively low pressures in the distributing pipe system to effect relatively large changes in the amount of the fluid admitted thereto and on higher and gradually increasing pressures therein to effect gradually decreasing changes in the amount of the fluid admitted thereto to thereby maintain substantially constant the pressure of the fluid medium within the distributing pipe system and at the inlet orifices of the heat transfer devices required to supply predetermined quantities of the fluid medium to the heat transfer devices.

5. In a system of the character described, the combination of a source of supply of a fluid medium, a distributing pipe system, a plurality of heat transfer devices connected with the distributing pipe system, means for controlling the supply of the fluid medium from the supply source to the distributing pipe system adjustably responsive to different pressures of the fluid medium within the distributing pipe system and including a motor actuated valve, a pressure responsive member and a substantially parabolic varying moment lever system through which the pressure responsive member acts to control the valve motor and is operative to maintain substantially constant a predetermined pressure of the fluid medium within the distributing pipe system and at the inlet orifices of the heat transfer devices, and means controllable manually from a remote point for effecting adjustments in the control means whereby said means will respond to different pressures of the fluid medium.

6. In a system of the character described, the combination of a source of supply of a fluid medium, a distributing pipe system, a plurality of heat transfer devices connected with the distributing pipe system, means for controlling the supply of the fluid medium from the supply source to the distributing pipe system adjustably responsive to different conditions of the fluid medium within the distributing pipe system and including a motor actuated valve, a pressure responsive member and a substantially parabolic varying moment lever system through which the pressure responsive member acts to control the valve motor and is operative to maintain substantially constant a predetermined pressure of the fluid medium within the distributing pipe system and at the inlet orifices of the heat transfer devices, and means controlled by a member responsive to differential air pressures due to wind, air currents, and the like for effecting the adjustments in the control means whereby said means will respond to different conditions of the fluid medium.

7. In a system of the character described, the combination of a source of supply of a fluid medium, a distributing pipe system, a plurality of heat transfer devices connected with the distributing pipe system, means for controlling the supply of the fluid medium from the supply source to the distributing pipe system adjustably responsive to different conditions of the fluid medium within the distributing pipe system and including a motor actuated valve, a pressure responsive member and a substantially parabolic varying moment lever system through which the pressure responsive member acts to control the valve motor and is operative to maintain substantially constant a predetermined pressure of the fluid medium within the distributing pipe system and at the inlet orifices of the heat transfer devices, and means controlled jointly and separately by a member responsive to temperature and a member responsive to differential air pressure due to wind, air currents and the like for effecting the adjustments in the control means whereby said means will respond to different conditions of the fluid medium.

8. In a system of the character described, the combination of a source of supply of a fluid medium, a distributing pipe system, a plurality of heat transfer devices connected with the distributing pipe system, means for controlling the supply of the fluid medium from the supply source to the distributing pipe system adjustably responsive to different conditions of the fluid medium within the distributing pipe system and including a motor actuated valve, a pressure responsive member and a substantially parabolic varying moment lever system through which the pressure responsive member acts to control the valve motor and is operative to maintain substantially constant a predetermined pressure of the fluid medium within the distributing pipe system and at the inlet orifices of the heat transfer devices, and means both controlled by a member responsive to differential outside and inside atmospheric conditions and controllable manually from a remote point for effecting the adjustments in the control means whereby said means will respond to different conditions of the fluid medium.

9. In a system of the character described, the combination of a source of supply of a fluid medium, a distributing pipe system, a plurality of heat transfer devices connected with the distributing pipe system at different points thereon, said devices having inlet orifices of an area offering high resistance relative to the resistance of the distributing pipe system to the flow of the fluid medium therethrough and being proportioned to the heat transfer capacity of each device irrespective of its point of connection with the distributing pipe system, and means adjustably responsive to different pressures of the fluid medium within the distributing pipe system for controlling the admission thereto of the fluid medium from the supply source and comprising a motor actuated valve, a pressure responsive member, and a substantially parabolic varying moment lever system through which said member is operative to control the valve motor to maintain substantially constant an adjustable predetermined pressure of the fluid medium at the inlet orifices of the heat transfer devices irrespective of the number and location of such thereof as may be turned on or off.

10. In a system of the character described, the combination of a source of steam supply, a distributing pipe system, a plurality of radiators connected with the distributing pipe system at different points thereon and having inlet orifices of an area offering high resistance relative to the resistance of the distributing pipe system to the flow of steam therethrough and proportioned to the radiating surface of each radiator irrespective of its point of connection with the distributing pipe system, and means for controlling the supply of steam from the supply source to the distributing pipe system adjustably responsive to different pressures of the steam within the distributing pipe system and including a motor-actuated valve, a pressure responsive member, and a substantially parabolic varying moment connecting system through which the pressure responsive member acts to control the valve motor and is operative to maintain substantially constant a predetermined pressure of the steam within the distributing pipe system and at the inlet orifices of the radiators regardless of the number and location of such thereof as may be turned on or off.

11. In a system of the character described, the combination of a source of steam supply, a distributing pipe system, a plurality of radiators connected with the distributing pipe system at different points thereon and having inlet orifices of an area and structure offering high resistance relative to the resistance of the distributing pipe system to the flow of steam therethrough and proportioned approximately to the radiating surface of each radiator, means for controlling the supply of the steam from the supply source to the distributing pipe system adjustably responsive to different conditions of the steam within the distributing pipe system, and means controlled by a member responsive to differential air pressures due to wind, air currents and the like for effecting the adjustments in the control means whereby said means will respond to different conditions of the steam.

12. In a system of the character described, the combination of a source of steam supply, a distributing pipe system, a plurality of radiators connected with the distributing pipe system at different points thereon and having inlet orifices of an area offering high resistance relative to the resistance of the distributing pipe system to the flow of steam therethrough and proportioned approximately to the radiating surface of each radiator, means for controlling the supply of the steam from the supply source to the distributing pipe system adjustably responsive to different conditions of the steam within the distributing pipe system, and means controlled jointly and separately by a member responsive to temperature and a member responsive to differential air pressures due to wind, air currents and the like for effecting the adjustments in the control means whereby said means will respond to different conditions of the steam.

13. In a system of the character described, the combination of a source of steam supply, a distributing pipe system, a plurality of radiators connected with the distributing pipe system at different points thereon and having inlet orifices of an area offering high resistance relative to the resistance of the distributing pipe system to the flow of steam therethrough and proportioned approximately to the radiating surface of each radiator, means for controlling the supply of the steam from the supply source to the distributing pipe system adjustably responsive to different conditions of the steam within the distributing pipe system and including a motor actuated valve, a pressure responsive member, and a substantially parabolic varying moment connecting system through which the pressure responsive member acts to control the valve motor and is operative to maintain substantially constant a predetermined pressure of the steam within the distributing pipe system and at the inlet orifices of the radiators, and means both controlled by a member responsive to an outside atmospheric condition and controllable manually from a remote point for effecting the adjustments in the control means whereby said means will respond to different conditions of the steam.

14. A system of the character described comprising a source of supply of a fluid medium, a plurality of distributing zones, a pipe system for each zone, heat transfer devices connected with each pipe system, means associated with each pipe system adjustably responsive to different pressure variations of the fluid medium therein for controlling the flow of the fluid medium thereto from the supply source, and means responsive to differential air pressures due to wind, air currents and the like for effecting the adjustment of the control means associated with the pipe system of a distributing zone.

15. A system of the character described comprising a source of supply of a fluid medium, a plurality of distributing zones, a pipe system for each zone, heat transfer devices connected with each pipe system, means associated with each pipe system adjustably responsive to different pressures of the fluid medium therein for controlling the flow of the fluid medium thereto from the supply source, and means responsive to variations of temperatures and means responsive to variations of differential air pressures due to wind, air currents and the like operative jointly and separately to effect the adjustment of the control means associated with the pipe system of a distributing zone.

16. A system of the character described comprising a source of supply of a fluid medium, a plurality of distributing zones, a pipe system for each zone, heat transfer devices connected with each pipe system, means associated with each pipe system adjustably responsive to different pressures of the fluid medium therein for controlling the admission of the fluid medium thereto from the supply source, and means controllable manually from a given remote point for effecting the adjustments in said control means.

17. A system of the character described comprising a source of supply of a fluid heating medium, a plurality of distributing zones, a pipe system for each zone, heat transfer devices connected with each pipe system, means associated with each pipe system adjustably responsive to different pressures of the fluid heating medium therein controlling the admission of said medium thereto from the supply source, and means associated with each zone automatically controlling the adjustments in the control means associated with the pipe system thereof.

18. A system of the character described comprising a building, a plurality of groups of heat transfer devices associated with different wall exposures of said building, a source of supply of a fluid heating medium, branch pipe systems connecting the source of the fluid heating medium with the respective groups of heat transfer devices, separate control valves in the respective branch pipe systems for controlling the amount of the fluid heating medium supplied to the corresponding groups of heat transfer devices, and separate means responsive to changes of atmospheric conditions outside of and adjacent the wall exposure of the building with which a group of heat transfer devices is associated for controlling the valve in the branch pipe system connected with said group of heat transfer devices.

19. A system of the character described comprising a building, a plurality of groups of heat transfer devices associated with different wall exposures of said building, a source of supply of a fluid heating medium, branch pipe systems connecting the source of the fluid heating medium with the respective groups of heat transfer devices, separate control valves in the respective branch pipe systems for controlling the amount of the fluid heating medium supplied to the corresponding groups of heat transfer devices, and separate means for controlling each of the control valves responsive to differential pressures of air outside and within the building adjacent the respective groups of heat transfer devices connected therewith.

20. A system of the character described comprising a building, a source of supply of a fluid heating medium, a plurality of heat transfer devices within the building, a pipe system connecting the fluid heating medium source with the heat transfer devices, and means responsive to differential air pressures outside and inside the building for varying the pressure of the fluid heating medium in the pipe system.

21. A system of the character described comprising a building, a source of supply of a fluid heating medium, heat transfer devices arranged within the building in a plurality of groups, pipes connecting the source of the fluid heating medium with the respective groups of heat transfer devices, valves in the pipes connecting with the respective groups of heat transfer devices for controlling the supply of the fluid heating medium thereto, and means under the control of differential pressures of air outside and within the building for automatically adjusting the valves to supply more or less fluid heating medium to the respective groups of heat transfer devices.

22. A system of the character described comprising a source of supply of a fluid medium, a plurality of distributing zones, a pipe system for each zone, heat transfer devices connected with each pipe system, means associated with each pipe system adjustably responsive to different conditions of the fluid medium therein for controlling the flow of the fluid medium thereto from the supply source, and means controlled by a member responsive to an atmospheric condition for effecting the adjustments of the control means associated with the several zones and means controllable manually from a single given point for effecting the adjustments of the control means associated with any zone.

23. In a system of the character described, the combination of a source of supply of a fluid medium, a distributing pipe system, heat transfer devices connected with the distributing pipe system, means responsive to pressure variations of the fluid medium within the distributing pipe system operative to control the admission of the fluid medium thereto from the supply source, and a control device for an individual heat transfer device comprising a throttling member mounted within the pipe connection of said device adjacent the inlet orifice thereto and means responsive to the temperature of the air surrounding said device operative on a change of such temperature in one direction to effect an increase and on a change thereof in the other direction to effect a decrease in the amount of the fluid medium passing through the inlet orifice to said device.

24. In a system of the character described, the combination of a source of supply of a fluid medium, a distributing pipe system, heat transfer devices connected therewith, means responsive to pressure variations of the fluid medium within the distributing pipe system operative to control the admission thereto of the fluid medium from the supply source, and means responsive to variations of temperature adjacent an individual heat transfer device for varying the effective size of but without closing the inlet orifice from the distributing pipe system to said device.

25. In a system of the character described, the combination of a source of supply of a fluid medium, a distributing pipe system, heat transfer devices connected with the distributing pipe system, means responsive to pressure variations of the fluid medium within the distributing pipe system operative to control the admission thereto of the fluid medium from the supply source, and a control device comprising a throttling member mounted adjacent the inlet orifice of a heat transfer device to move within fixed limits forward towards and backward from said orifice, to thereby regulate the flow of the fluid medium to said device, and normally biased to position at the limit of its forward movement, a thermostat, and means controlled by the thermostat operative on a change of temperature to a predetermined degree in one direction to effect the withdrawal of the throttling member from the inlet orifice of said device and on a change of temperature to a predetermined degree in the opposite direction to release the throttling member to allow it to return to its normal forward position.

26. Steam heating apparatus including heat radiating elements, a steam main for supplying steam thereto, and wind and temperature responsive mechanism for automatically varying the steam pressure in said main in response to changes both in wind velocity and in outside temperature.

27. Steam heating apparatus including a source of steam supply, a pressure regulating valve, a plurality of heat radiating elements, a supply pipe conducting steam from said supply source to said valve, a steam pipe conducting steam from said valve to said radiating elements, and wind and temperature responsive means for controlling said regulating valve to vary the pressure in said steam pipe in response to variations in wind velocity and in temperature.

28. Steam heating apparatus including a source of steam supply, a pressure regulating valve, a plurality of heat radiating elements, a supply pipe conducting steam from said supply source to said valve, a steam pipe conducting steam from said valve to said heat radiating elements, and wind responsive means and temperature responsive means jointly and separately controlling said regulating valve to vary the pressure in said steam pipe in response to variations in wind velocity and in temperature.

29. In combination radiators, heating fluid supply means, heating fluid flow control means between said supply means and radiators, a cam, a follower for the cam, a lever governed by the throw of the follower for controlling said heating fluid flow controlling means, and means responsive to changes in temperature and means responsive to movements of air jointly controlling the throw of the follower by the cam.

30. In combination radiators, heating fluid supply means, heating fluid pressure controlling means between said supply means and the radiators, a thermostat subject to outside temperatures, a movable cam the position of which is controlled by the thermostat, a follower for the cam the position of which relative to the cam is controlled by the pressure under which the heating fluid is supplied to the radiators, a lever controlled by said follower, and means controlled by the lever for governing the heating fluid pressure controlling means.

31. Steam heating apparatus including heat radiating elements, a steam main for supplying steam thereto, and wind responsive mechanism for automatically varying the steam pressure in said main in response to changes in wind velocity, said wind responsive mechanism comprising motion transmitting means operative to convert motions due to changes in low wind velocities into relatively large throws and motions due to changes in progressively higher wind velocities into progressively smaller throws the relation of throw to motion substantially embodying the relation between pressure differences upon an orifice and the rate of flow therethrough.

32. The combination with a building, of a plurality of groups of radiators associated with different wall exposures of said building, a source of heat, branch mains leading from the source of heat to the respective groups of radiators, separate control valves in the respective branch mains for controlling the amount of heat supplied to the corresponding groups of radiators, and separate thermostatically controlled means for each of the separate control valves, the thermostatic elements of which are respectively arranged to be subjected to the temperature conditions outside the building adjacent to the respective groups of radiators whereby different portions of the interior of the building may be heated to substantially the same extent.

33. In an apparatus of the character stated, a structure to be heated having branch mains conveying heat from a source to different sides of the structure to be heated, a separate control valve for each of the branch mains, a plurality of thermostatic means each respectively exposed to the influence of different exterior atmospheric conditions affecting such different sides, separate means under the influence of each of the respective thermostatic means for automatically varying the degree of opening and closing of the respective valves to independently vary the heat input to the respective different sides of the structure to suit requirements for maintaining a substantially constant interior temperature, and manually adjustable means for changing the relative operation of the said valves one to the other whereby the automatic operation of said valves under thermostatic control may be modified in respect to the amount of steam delivered to the corresponding valve of the branch mains.

34. In an apparatus of the character stated, a building to be heated, radiators therefor, steam mains for supplying steam to said radiators, a main valve for controlling the supply of steam to the mains, and an electrically actuated power means for controlling the main valve, combined with a source of electric energy, thermostatically controlled means for controlling the supply of electricity from the source for causing the electrically actuated power means to be put into intermittent action for each of a predetermined unit temperature change, circuits and switch mechanism for inversely controlling the supply of electric current to the electrically actuated means for controlling the main valve with each unit change in temperature and for temporarily shutting off the supply of electric current with each complete movement of the electrically actuated power means, and a plurality of heating zones separately controlled under independent thermostatic control means operating in accordance with outside temperature conditions.

WEBSTER TALLMADGE.